United States Patent Office 3,091,596
Patented May 28, 1963

3,091,596
WATER BEARING RESIN BINDERS, PROCESS FOR PREPARING SAME, AND SAND COATED THEREWITH
Bernard Freedman, Springfield, and Rodney M. Huck, Longmeadow, Mass., assignors to Monsanto Chemical Company, St. Louis, Mo., a corporation of Delaware
No Drawing. Filed July 27, 1959, Ser. No. 829,508
22 Claims. (Cl. 260—19)

The present invention relates to metal founding and more particularly to resin-coated sands useful in producing shell molds and cores.

Shell molds and cores are now generally produced from foundry sands coated with (a) a thermosetting resin binder and (b) a cross-linking agent for said resin. The coated foundry sand is deposited on a heated metal pattern for a period of time sufficient only to form the coated sand into a facsimile mold or core, defining the pattern. The facsimile mold or core is then subjected to elevated temperatures in order to cure the resin binder to a thermoset condition. The result is a shell mold or core useful for casting metals, alloys, etc.

Among the resins presently used to coat these foundry sands are "novolac" resins. These are two-stage resins synthesized with an excess of phenol to formaldehyde, more specifically in mol ratio of 0.5 to 0.8 mol of formaldehyde for each mol of phenol. These resins are thermoplastic and brittle in nature when dehydrated. The amounts of novolac resin to sand required for making shell molds, generally ranges from 4.5 to 6.0 parts by weight on a resin solids basis, per 100 parts of sand.

In order to facilitate uniform coating of the novolac resin onto the sand and incidentally contribute tensile strength to the shell molds which result, it has become the practice to use an alcohol solution of the resin, generally 30 to 40 parts by weight of alcohol based on 100 parts of phenol. The alcohol solvated resin, cross-linking agent and the sand are then intensively blended together in a muller or the like while simultaneously being subjected to heat ranging 150° F. to 250° F. The time expended for the same is that sufficient to cause the alcohol and other volatiles to be removed, and to advance the resin to the point at which the now resin-coated sands can be described as exhibiting a desired "stick-point." The latter is that stage of advancement at which a resin-sand layer (1/16" thick) will adhere to a metal bar heated conductively through a temperature gradient, e.g., 160°–250° F. The lowest temperature on the bar, at which the mix adheres, is designated the "stick-point" for the particular resin. The desired stick-points for resin-coated sands useful in shell molding are 175°–210° F. for those used in the cores, and 190°–225° F. for those used in the molds. A heating and mulling period of 5–15 minutes for the mulling temperatures mentioned above, is usually sufficient to contribute advance of this magnitude to the resins, while allowing the resin-coated sands to be particulate in nature at room temperature. After cooling and screening, the product which results is a free-flowing, pulverulent resin-coated sand, the individual grains of which are coated with a potentially thermosetting resin.

While the preceding method for preparing resin-coated foundry sands, using alcohol solvated novolac resins, has been a distinctive advance in the field of shell molding, nevertheless one drawback has accompanied it, to wit: the volatilization of the alcohol or other organic solvent during or immediate to mulling at the elevated temperatures mentioned has presented a considerable fire hazard.

Accordingly, it is a principal object of the present invention to provide an improved resin product with which to coat foundry sands for use in shell molds.

Another object of the present invention is to provide water-borne, alcohol solvated resins, which when used together with an accelerator to coat foundry sands in hot mulling or blending processes, are accompanied by minimum fire hazard.

Another object is to provide free-flowing particulate resin-coated foundry sands, the individual sand particles of which are coated with a partially-advanced thermosetting resin.

Other objects of the invention will in part be obvious and will in part appear hereinafter.

These and other objects of the invention are attained in one-phase liquid resin products peculiarly adapted for use in coating foundry sands for shell molds and cores comprising in combination (a) an acid catalyzed novolac resin, (b) water, (c) glycol and (d) alcohol.

The following examples are provided in illustration of the invention. Where parts are mentioned, parts by weight are intended.

EXAMPLE I

Charge 100 parts of phenol (1.06 mols) and 0.3 parts of sulfuric acid (conc.) into a reactor provided with a condenser, reflux-return line and an agitator, then raise the temperature to about 95° C. Meter in 64 parts of formalin (37% formaldehyde) (.79 mol). Following the completion of this addition, reflux the reaction mixture at atmospheric pressure (about 100° C.), for a period of about 20 minutes. Distill off 45 parts of water. Cool the resin which remains to 80° C. and while maintaining this temperature, slowly blend into the resin 14 parts of ethyl alcohol, then agitate for 15 minutes and add 2 parts of ethylene glycol. The resin product which results is a one-phase liquid, water-bearing novolac having a viscosity of approximately 15,000 centipoises/Brookfield. The water bound in the resin product is determined as being about 11 weight percent based on the weight of resin product.

EXAMPLE II

Charge 100 parts of phenol (1.06 mols) and 0.3 part of sulfuric acid (conc.) into the reactor and heat to about 95° C. Gradually add 64 parts of formalin (37% formaldehyde) (.79 mol), and reflux the reaction mixture at 100° C. under atmospheric conditions for about 20 minutes. Distill off 28 parts of the water. Cool the resin which now remains to 80° C. and while maintaining this temperature add, under agitation, 6 parts of lime slurried in 12 parts of water. When the slurry has become dispersed throughout the resin, gradually blend in 14 parts of ethyl alcohol, followed by 2 parts of ethylene glycol. The resin product which results is a one-phase liquid, water-bearing novolac resin having a viscosity of approximately 10,000 centipoises/Brookfield. The water bound in the product is determined as being about 26 weight percent, based on the weight of the total resin product.

To illustrate the effectiveness of the resin products of the present invention in metal founding, the following testing procedures are carried out.

Portions of the resin products of Examples I and II are provided with 16 parts of hexamethylene tetramine and 3 parts by weight of calcium stearate, each determined on resin solids. These are then blended with sand in a laboratory muller having a variable hot air source and vapor venting means, at 275° F. for 9–12 minutes.

A dehydrated, acid catalyzed novolac resin, ground to 200 mesh (U.S. standard) containing 14 parts of hexamethylene tetramine is blended with sand at room temperature in the muller for a period of 5 minutes. This resin has the molar constituency of the exemplary materials and will be designated as "resin A."

An acid catalyzed dehydrated novolac resin having the molar constituency of the exemplary products and identified as "resin B" is solvated in 30% on resin solids of ethyl alcohol. This is then mulled with a previously blended mix of sand, 16 parts of hexamethylene and 3 parts of calcium stearate, both on resin solids, in the muller with forced air heated and maintained at 150° F. for 5–9 minutes. This comparatively low temperature is necessitated by the combustible nature of the alcohol in vaporized form.

Each of the resin-coated sands above are formed into a number of standard AFS tensile-test briquettes c.s.a. 0.25 x 1.0 inch. In doing so the mold is filled and struck off at 400° F. The facsimile briquettes are then cured for 2 minutes at 600° F. After cooling, the briquettes are tested in a Dietert Universal sand tester for tensile strength at room temperature (cold).

Hot tensile strength of each of resin-sand mixes is determined by retaining briquettes having the configurations above, and cured at 400° F. for 90 seconds, in a split mold and subjecting them to tension at this temperature. The outcome of this test reflects speed of cure of the resin.

Scratch hardness is determined by use of Dietert scratch hardness tester.

Stick-point is determined in the manner previously described.

The results from the tests carried on are as follows; component amounts are in parts by weight:

*Table I*

| Resin | Percent resin (solids basis) | Sand | AFS tensile strength, p.s.i. | Hot tensile strength, p.s.i. | Scratch hardness, AFS | Stick-point, ° F. |
|---|---|---|---|---|---|---|
| Resin A | 3.0 | Round grain | 225 | 80 | 60 | 210 |
| Resin B | 3.0 | do | 500 | 170 | 75 | 205 |
| Ex. I | 2.7 | do | 550 | 220 | 80 | 205 |
| Ex. I | 2.5 | do | 600 | 195 | 80 | [1] 190 |
| Ex. I | 2.5 | do | 900 | 170 | 80 | [1] 175 |
| Ex. II | 3.0 | do | 400 | 200 | 80 | 210 |
| Ex. II | 3.5 | do | 450 | 250 | 80 | 205 |

[1] Note the effect of stick-point on tensile strength. Generally the lower the stick-point, the higher will be the tensile strength—cold (room temperature).

EXAMPLES III–XII

A similar process to that practiced in Example II is again followed, in order to provide other resin products useful in providing resin-coated sands for eventual use in shell molds and cores. The constituents and amounts used are indicated in Table II following, in which the amounts are given in parts by weight. Note that the examples using oxalic and boric acids as catalysts require a longer resinification step, i.e., 2 hours, than those examples using sulfuric acid.

the resin products is determined as being 22% to 30% weight percent based on the total resin products; consequently, these products exhibit excellent non-flammability properties.

The present invention is directed to one-phase liquid resin products adapted for coating foundry sands to be eventually used in shell molds and cores. These products comprise, in combined form, (a) an acid catalyzed novolac resin, (b) water, (c) glycol and (d) alcohol.

The novolac resins which can be used in practice of the present invention are those constituting in mol ratio 0.5–0.8 mol of formaldehyde for each mol of phenol, and more particularly 0.6–0.75 mol of formaldehyde per mol of phenol. The formaldehyde can be used in the various known forms, including formalin (37% aqueous solution) paraform, etc. The phenol can be phenol, meta cresol and mixtures thereof, as well as mixtures including ortho, para and metal alkyl substituted phenols. These resins are acid catalyzed. Acid catalysts which can be used include sulfuric acid, hydrochloric, oxalic, boric, phenol-sulphonic acid, etc.

The process utilized in providing the novolac resins can be that usually practiced, in which phenol and the acid catalyst are added to a suitable reaction vessel and heated to about 95° C. This is followed by gradual addition of the formaldehyde to the molten phenol. The reaction mixture is raised to reflux temperature and maintained so for a period of about 20–120 minutes depending upon the acid catalyst chosen. The reaction product is a two-phase liquid-resin system, the top layer being essentially water and the bottom layer resin containing a small amount of water, i.e., about 5% on the weight of the solid resin. The water contained in both layers can be dehydrated by any convenient method to provide a thermoplastic lump novolac resin.

The present invention can be practiced by departing from the procedure set forth above, in that only a portion of the top layer (water) of the reaction product is removed. The water then remaining in the top layer plus the residual water contained in the lower layer (resin) is caused to become intimately bound up in the novolac to provide the desired resin product. This can be achieved by blending the reaction product which remains after the water-removal step with glycol and alcohol. Blending can be carried out at temperatures ranging 75–95° C. and more preferably 80 to 90° C. The amount of water which can be bound in this manner can range as high as 9–13% by weight of the final resin product.

In another embodiment having additional resistance to flammability, water constituting 21–30% of the total resin product can be bound into the resin product by blending in addition to the glycol and alcohol mentioned above, between 5–10 parts by weight of lime ($CaOH_2$) as determined on 100 parts by weight of the phenol charge. As indicated in the exemplary materials, these

*Table II*

| Example | III | IV | V | VI | VII | VIII | IX | X | XI | XII |
|---|---|---|---|---|---|---|---|---|---|---|
| Phenol | 100 | 100 | 100 | 100 | 100 | 100 | 100 | 100 | 100 | 100 |
| Formaldehyde | 62 | 62 | 63 | 64 | 64 | 64 | 64 | 62 | 64 | 26 Paraform |
|  | Formalin |  |  |  |  |  |  |  |  |  |
| Catalyst | 0.3 $H_2SO_4$ | 0.3 | 0.3 | 0.3 | 0.3 | 0.3 | 0.3 | 2.0 $C_2H_2O_4 \cdot 2H_2O$ | 2.0 | 1.0 $H_3BO_4$ |
| Water |  |  |  |  |  |  |  | 4.0 | 4.0 |  |
| Lime in | 6 | 5 | 5 | 5 | 6 | 3 | 4 | 6 | 6 | 6 |
| Water | 12 | 10 | 12 | 12 | 12 | 12 | 12 | 12 | 12 | 12 |
| Ethyl alcohol | 14 | 14 | 14 | 14 | 14 | 14 | 14 | 14 | 14 | 14 |
| Ethylene glycol | 2 | 2 | 2 | 2 | 2 | 2 | 2 | 2 | 2 | 2 |
| Others |  |  |  |  |  |  |  |  |  | [1] 22 |

[1] Water.

Each of the resin products produced is a one-phase liquid, water-bearing novolac having a viscosity of 10,000 to 14,000/Brookfield.[2] The amount of water bound in

[2] Viscosities observed at 25° C. throughout.

resins have improved hot tensile strength reflective of faster curing times and faster processing times, but lessened cold tensile when compared to the remaining resins of the present invention. Preferably, the lime is introduced as an aqueous slurry after the resinification step, and prior to the addition of the glycol and alcohol. When this embodiment is practiced, a lesser amount of water need be removed following the resinification step. In either embodiment, it is of course possible to remove any or all of the water during or after the resinification step, and replace with the amount of water desired to be bound into the resin product, the limit as to the amount of water capable of being bound up being prescribed above.

For best results, the amount of glycol which can be included in the resin products ranges 2–5 parts by weight per 100 parts by weight of the phenol while the alcohol can range 11–14 parts by weight per 100 parts by weight of the phenol. The glycols which can be used are ethylene glycol, propylene glycol, etc. and mixtures of the same, which are miscible in water. Ethylene glycol is preferred. The alcohols then include those which are liquid at room temperature and miscible in water such as methyl, ethyl, propyl, etc., and mixtures of the same. The ethyl alcohol is preferred.

The resin products can be directly used in coating sand together with cross-linking agents exemplified by hexamethylene tetramine. The amount of cross-linking agent is generally 14–16 parts per weight as determined on resin solids. The amount of resin product to be used need only be 2–4.5 weight percent resin solids per 100 parts of sand. Greater amounts of the resin product can be used to lend further tensile strength, etc. to the resulting shell molds and cores, but for usual practice, the above amounts are sufficient. This is to be compared with conventional two-stage novolac resins which generally require upward from 6.0% on a resin solids basis per 100 parts of sand to give tensile strengths in the final shell molds or cores comparable to those evidenced by the lesser amounts of the featured resin products.

In addition to resin product and cross-linking agents, lubricants can also be included in the resin product sand mix. These include the various alkali metal soaps such as aluminum stearate, calcium stearate, magnesium stearate, zinc stearate, etc. The amounts of lubricant which can be used to good advantage are 3–6 weight percent as determined on the weight of the resin solids. The sand which can be used in the coating operation are those used in foundry practices, such as round grain sands and subangular sands which have been washed free of clay, and dried. Mixing of the resin products with the sand can be in a muller or other blender or mixer under forced hot air temperatures of 150–600° F. for a suggested period of 5–15 minutes to advance the resins to the stick-points previously described. This can be done utilizing the resin products of the present invention without ignition of the vapors passing off. It is theorized that the vapors, volatilized from the resin products of the present invention, include the alcohol in an azeotropic form with the glycol and water, causing the alcohol to be non-combustible when exposed to the temperatures above, during the hot mulling.

Additionally, the resin-coated sands which result from using the resin products of the present invention are free-flowing, non-caking and dust-free in nature. When formed into shell molds and cores, these exhibit improved dimensional definition, tensile strength and scratch hardness, as compared to molds and cores formed from sands coated with conventional novolac resins. The shell molds and cores which result can be used in casting ferrous metals, nonferrous metals and alloys of each.

It will thus be seen that the objects set forth above, among those made apparent from the preceding description, are efficiently attained and, since certain changes can be made in the products, and in carrying out the process of the present invention without departing from the scope of the invention, it is intended that all matter contained in the above description shall be interpreted as illustrative, and not in a limiting sense.

What is claimed is:

1. A one-phase liquid resin product adapted for coating foundry sands useful in producing shell molds and cores comprising in combination (a) an acid catalyzed novolac resin containing formaldehyde and a phenolic compound in proportions of from 0.5 to 0.8 mol of formaldehyde per mol of the phenolic compound, (b) from 9 to 30 weight percent of water based upon the resin product, (c) from 2 to 5 parts of a glycol selected from the group consisting of ethylene glycol, propylene glycol, and mixtures thereof, and (d) from 11 to 14 parts of an alcohol selected from the group consisting of methyl, ethyl and propyl alcohols, and mixtures thereof; the proportions of glycol and alcohol being expressed as parts by weight per 100 parts of total phenolic compound, free plus combined, present in said novolac resin.

2. A resin product as in claim 1 wherein the phenolic compound is phenol.

3. A resin product as in claim 2 wherein the proportion of water is from 9 to 13 weight percent.

4. A resin product as in claim 2 wherein the glycol is ethylene glycol.

5. A resin product as in claim 2 wherein the alcohol is ethyl alcohol.

6. A process for providing a one-phase liquid resin product adapted for coating foundry sands useful in producing shell molds and cores which comprises blending, respectively, from 2 to 5 parts of a glycol and from 11 to 14 parts of an alcohol into an acid catalyzed novolac resin containing from 9 to 30 weight percent, based upon the resin product, of water, while maintaining a temperature of from 75 to 90° C.; said novolac resin containing formaldehyde and a phenolic compound in proportions of from 0.5 to 0.8 mol of formaldehyde per mol of the phenolic compound, the proportions of glycol and alcohol employed being expressed as parts by weight per 100 parts of total phenolic compound, free plus combined, present in said novolac resin; said glycol being selected from the group consisting of ethylene glycol, propylene glycol, and mixtures thereof, and said alcohol being selected from the group consisting of methyl, ethyl and propyl alcohols, and mixtures thereof.

7. A process as in claim 6 wherein the phenolic compound is phenol.

8. A process as in claim 7 wherein the proportion of water is from 9 to 13 weight percent.

9. A process as in claim 7 wherein the glycol is ethylene glycol.

10. A process as in claim 7 wherein the alcohol is ethyl alcohol.

11. A one-phase liquid resin product adapted for coating foundry sands useful in producing shell molds and cores comprising in combination (a) an acid catalyzed novolac resin containing formaldehyde and a phenolic compound in proportions of from 0.5 to 0.8 mol of formaldehyde per mol of the phenolic compound, (b) from 9 to 30 weight percent of water based upon the resin product, (c) from 2 to 5 parts of a glycol selected from the group consisting of ethylene glycol, propylene glycol, and mixtures thereof, (d) from 11 to 14 parts of an alcohol selected from the group consisting of methyl, ethyl and propyl alcohols, and mixtures thereof, and (e) from 5 to 10 parts of lime; the proportions of glycol, alcohol and lime being expressed as parts by weight per 100 parts of total phenolic compound, free plus combined, present in said novolac resin.

12. A resin product as in claim 11 wherein the phenolic compound is phenol.

13. A resin product as in claim 12 wherein the proportion of water is from 22 to 30 weight percent.

14. A resin product as in claim 12 wherein the glycol is ethylene glycol.

15. A resin product as in claim 12 wherein the alcohol is ethyl alcohol.

16. A process for providing a one-phase liquid resin product adapted for coating foundry sands useful in producing shell molds and cores which comprises blending, respectively, from 5 to 10 parts of lime, from 2 to 5 parts of a glycol and from 11 to 14 parts of an alcohol into an acid catalyzed novolac resin containing from 9 to 30 weight percent, based upon the resin product, of water, while maintaining a temperature of from 75 to 90° C.; said novolac resin containing formaldehyde and a phenolic compound in proportions of from 0.5 to 0.8 mol of formaldehyde per mol of the phenolic compound, the proportions of glycol, alcohol and lime employed being expressed as parts by weight per 100 parts of total phenolic compound, free plus combined, present in said novolac resin; said glycol being selected from the group consisting of ethylene glycol, propylene glycol, and mixtures thereof, and said alcohol being selected from the group consisting of methyl, ethyl and propyl alcohols, and mixtures thereof.

17. A process as in claim 16 wherein the phenolic compound is phenol.

18. A process as in claim 17 wherein the proportion of water is from 22 to 30 weight percent.

19. A process as in claim 17 wherein the glycol is ethylene glycol.

20. A process as in claim 17 wherein the alcohol is ethyl alcohol.

21. A free-flowing particulate resin-coated foundry sand having coated thereon the resin product prepared by the process of claim 16; said particulate resin-coated foundry sand having associated therewith based on the weight of resin solids 14–16 parts of hexamethylene tetramine and 3–6 weight percent of a metal stearate selected from the group consisting of aluminum stearate, calcium stearate, magnesium stearate and zinc stearate.

22. A process for preparing a free-flowing particulate resin-coated foundry sand, which process consists essentially of admixing under forced hot air temperatures of 150–600° F., a foundry sand with a one-phase liquid resin product having associated therewith based on the weight of resin solids, 14–16 parts of hexamethylene tetramine and 3–6 weight percent of a metal stearate and mixing until the resin-coated foundry sand is free-flowing and has a stick point of 175–225° F.; said one-phase liquid resin product comprising in combination (a) an acid catalyzed novolac resin containing formaldehyde and a phenolic compound in proportions of from 0.5 to 0.8 mol of formaldehyde per mol of the phenolic compound, (b) from 9 to 30 weight percent of water based upon the resin product, (c) from 2 to 5 parts of a glycol selected from the group consisting of ethylene glycol, propylene glycol, and mixtures thereof, and (d) from 11 to 14 parts of an alcohol selected from the group consisting of methyl, ethyl and propyl alcohols, and mixtures thereof; the proportions of glycol and alcohol being expressed as parts by weight per 100 parts of total phenolic compound, free plus combined, present in said novolac resin; said metal stearate being selected from the group consisting of aluminum stearate, calcium stearate, magnesium stearate and zinc stearate.

References Cited in the file of this patent

UNITED STATES PATENTS

| | | |
|---|---|---|
| 1,989,243 | Nash et al. | Jan. 29, 1935 |
| 2,706,188 | Fitko et al. | Apr. 12, 1955 |
| 2,806,832 | Drumm et al. | Sept. 17, 1957 |
| 2,965,514 | Less et al. | Dec. 20, 1960 |
| 2,999,283 | Barth | Sept. 12, 1961 |